US010001580B2

(12) United States Patent
Miles et al.

(10) Patent No.: US 10,001,580 B2
(45) Date of Patent: Jun. 19, 2018

(54) METHOD AND SYSTEM FOR BROADBAND MEASUREMENTS USING MULTIPLE ELECTROMAGNETIC RECEIVERS

(71) Applicant: CGG SERVICES SAS, Massy (FR)

(72) Inventors: Philip Miles, Rockwood (CA); Jason Berringer, Rockwood (CA)

(73) Assignee: CGG SERVICES SAS, Massy (FR)

(*) Notice: Subject to any disclaimer, the term of this patent is extended or adjusted under 35 U.S.C. 154(b) by 0 days. days.

(21) Appl. No.: 15/647,735

(22) Filed: Jul. 12, 2017

(65) Prior Publication Data
US 2017/0315255 A1 Nov. 2, 2017

Related U.S. Application Data

(63) Continuation of application No. 14/619,610, filed on Feb. 11, 2015, now Pat. No. 9,733,380.

(60) Provisional application No. 61/975,934, filed on Apr. 7, 2014.

(51) Int. Cl.
| | |
|---|---|
| *G01V 3/08* | (2006.01) |
| *G01V 3/00* | (2006.01) |
| *G01V 3/16* | (2006.01) |
| *G01V 3/165* | (2006.01) |

(52) U.S. Cl.
CPC .................... *G01V 3/165* (2013.01)

(58) Field of Classification Search
CPC .................................. G01V 3/12; G01V 3/16
USPC ......................................... 324/337, 330–331
See application file for complete search history.

(56) References Cited

U.S. PATENT DOCUMENTS

| 4,980,642 A | 12/1990 | Rodney |
| 2011/0210743 A1 | 9/2011 | Tompkins et al. |

FOREIGN PATENT DOCUMENTS

GB          000697933 A  *  9/1953

OTHER PUBLICATIONS

Nyboe et al., "Noise reduction in TEM: Presenting a bandwidth- and sensitivity-optimized parallel recording setup and methods for adaptive synchronous detection", Geophysics, May-Jun. 2012, pp. E203-E212, vol. 77, No. 3.

* cited by examiner

*Primary Examiner* — Bot Ledynh
(74) *Attorney, Agent, or Firm* — Patent Portfolio Builders PLLC

(57) ABSTRACT

An electromagnetic (EM) receiver system for measuring EM signals. The EM receiver system includes a frame; a first EM receiver attached to the frame and configured to measure the EM signals within a first frequency range; and a second EM receiver attached to the frame and configured to measure the EM signals within a second frequency range. Corresponding axes of the first and second EM receivers are substantially parallel to each other.

20 Claims, 10 Drawing Sheets

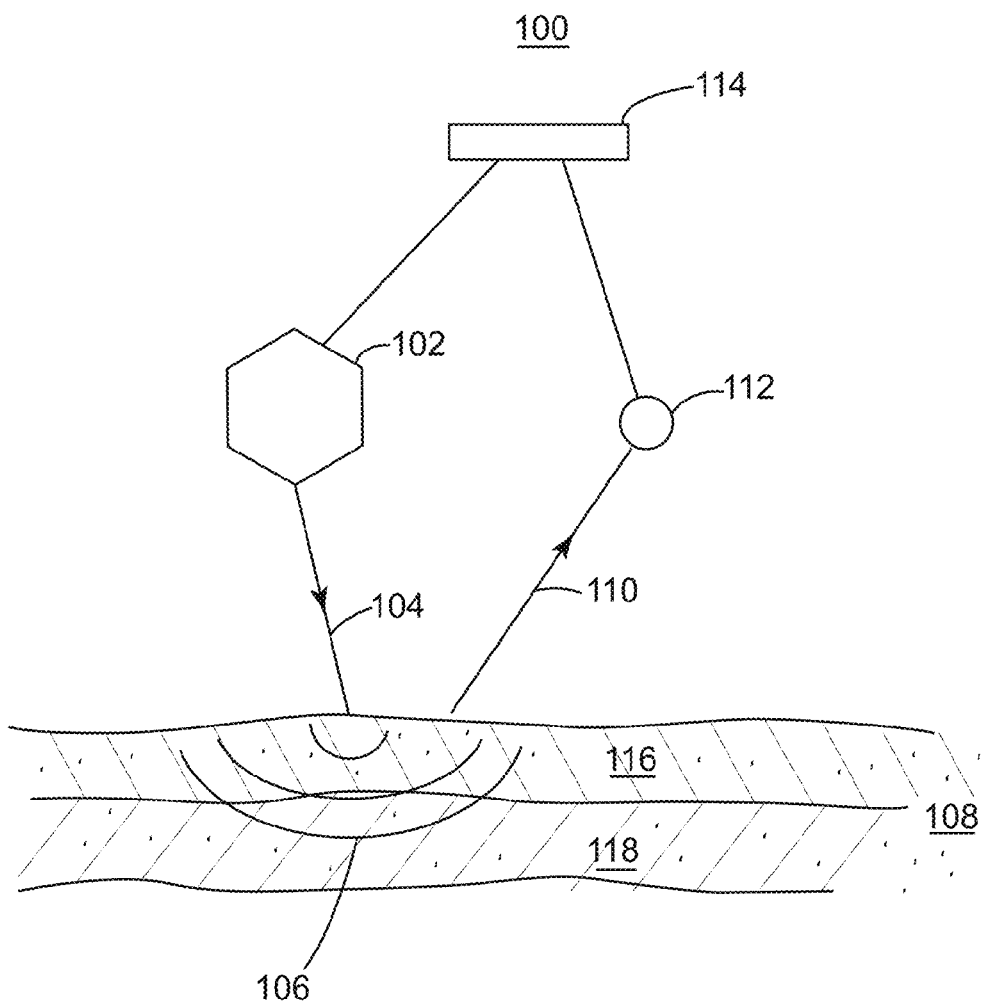

METHOD AND SYSTEM FOR BROADBAND MEASUREMENTS USING MULTIPLE ELECTROMAGNETIC RECEIVERS

CROSS-REFERENCE TO RELATED APPLICATIONS

This application is a continuation of U.S. patent application Ser. No. 14/619,610, filed Feb. 11, 2015, which claims priority and benefit from U.S. Provisional Patent Application No. 61/975,931, filed on Apr. 7, 2014, entitled "Multi-Coil EM Receiver", the disclosure of which is incorporated here by reference.

BACKGROUND

Technical Field

Embodiments of the subject matter disclosed herein generally relate to methods and systems and, more particularly, to mechanisms and techniques for broadband electromagnetic (EM) measurements using multiple EM receivers.

Discussion of the Background

EM surveying is a method of geophysical exploration to determine the properties of a portion of the earth's subsurface, information that is especially helpful in the oil and gas industry. EM surveys may be based on a controlled source that sends EM energy waves into the earth. By measuring the associated secondary fields with an EM receiver, it is possible to estimate the depth and/or composition of the subsurface features. These features may be associated with subterranean hydrocarbon deposits.

An airborne EM survey system 100 generally includes, as illustrated in FIG. 1, a transmitter 102 for generating a primary electromagnetic field 104 that is directed toward the earth. When the primary EM field 104 enters the ground 108, it induces eddy currents 106 inside the earth. These eddy currents 106 generate a secondary electromagnetic field or ground response 110. An EM receiver 112 then measures the response 110 of the ground. Transmitter 102 and receiver 112 may be connected to an aircraft 114 so that a large area of the ground is swept. Receiver 112 may be located concentric with transmitter 102. The currents induced in the ground are a function of the earth's conductivity and of course, the transmitter characteristics. By processing and interpreting the received signals, it is possible to study and estimate the distribution of conductivity in the subsurface. The distribution of conductivity is associated with the various layers 116 and 118 making up the subsurface, which is implicitly indicative of the location of oil and gas reservoirs, and/or other resources of interest for the mining industry.

EM systems can be either frequency-domain or time-domain. Both types of systems are based on Faraday's Law of electromagnetic induction, which states that a time-varying primary magnetic field will produce an electric field. Receiver 112 may consist of a series of wire loops 202, as shown in FIG. 2A, in which a voltage is induced proportional to the strength of the eddy currents in the ground and their rate of change with time. A receiver has an axis 204, as illustrated in FIG. 2A, which is substantially perpendicular (or normal) to the area defined by the coils. In one application, three receiver coils 112a-c are arranged to have their axes oriented along three Cartesian directions that are orthogonal to one another, as illustrated in FIG. 2B. Note that all three receiver coils 112a-c have the same geometry and characteristics and, thus, they are capable of measuring the same frequency range. Coils with their axes oriented in the same direction as the transmitter coil axis are most sensitive to horizontal layers. Coils with their axes orthogonal to the transmitter coil axis are most sensitive to discrete or vertical conductors.

For time-domain systems, a time-varying field is created by a current that may be pulsed. The change in the transmitted current induces an electrical current in the ground that persists after the primary field is turned off. Typical time-domain receiver coils measure the rate of change of this secondary field. The time-domain transmitter current waveform repeats itself periodically and can be transformed to the frequency domain where each harmonic has a specific amplitude and phase.

In EM geophysics with a passive source (i.e., EM fields induced naturally by the Earth, e.g., thunderstorms), the signals of interest sometimes have low amplitudes. In EM geophysics with an active source (i.e., EM fields generated with a transmitter), the frequency spectrum of the electromagnetic signals ranges from the excitation frequency (e.g., 25 Hz) to over 100 kHz. High-frequency energy occurs a short time after the transmitter's excitation. Thus, it is desirable to utilize a receiver which responds quickly (has a small-time constant) to accurately measure the high-frequency signals. However, at later times, low-frequency energy exists, and it is also desirable to measure these signals.

Current EM receivers have different sensitivities at low and high frequencies. In other words, an existing EM receiver is designed to accurately record a given range of EM frequencies used for the typical EM survey. Outside this range, the typical EM receiver records EM fields with poor accuracy. For example, all current systems must decide to optimize their receiver for measuring (1) high-frequency signals (using a high-frequency receiver, i.e., SkyTEM by SkyTEM Surveys ApS., or (2) broadband signals, which excel neither at high nor low frequencies, but sample the middle range well (such as TEMPEST, GeoTEM and HeliTEM, all by CGG) or (3) low-frequency signals (VTEM by Geotech).

A large number of factors affect the frequency resolution and bandwidth of a given EM receiver. Among these factors are the type of receiver, physical geometry of the receiver, number of coils, type of metal used for the coils, etc. For example, for an induction coil receiver measuring the time-rate change of the magnetic field, some of these factors are the receiver geometry, wire material, wire construction (single strand, multi-strand, Litz, etc.) and amount of wire.

More specifically, for a point far away from a transmitter coil, the magnetic field is proportional to the magnetic dipole moment of the coil and inversely proportional to the cube of the distance from the coil. The magnetic dipole moment of a coil is the product $N \cdot I \cdot A$, where $N$ is the number of turns, $I$ is the current, and $A$ is the coil area generating the magnetic dipole moment. The inductance of a coil is proportional to $N^2 D$, where $D$ is the diameter of the coil. The voltage induced in the receiver coil by a magnetic field $B$ is given by $N \cdot A \cdot dB/dt$, where coil sensitivity $NA$ is the product of the number of turns $N$ and coil area $A$, and $dB/dt$ is the time-derivative of the magnetic field. From here, it can be observed that for a slow-varying magnetic field $dB/dt$, it is necessary to increase either the number of turns $N$ or the coil's area $A$ to obtain a good induced voltage value. However, for a very fast-varying magnetic field $dB/dt$, the opposite is true, i.e., the receiver can have a small number of turns made of thin wires and a small coil's area $A$.

Thus, due to the law of physics for EM signals, it is not possible to have a single EM receiver that accurately measures fast- and slow-varying magnetic fields and, thus, there is a need for an EM system that accurately records EM fields over a large range of frequencies.

SUMMARY

According to one embodiment, there is an electromagnetic (EM) receiver system for measuring EM signals. The EM receiver system includes a frame; a first EM receiver attached to the frame and configured to measure the EM signals within a first frequency range; and a second EM receiver attached to the frame and configured to measure the EM signals within a second frequency range. Corresponding axes of the first and second EM receivers are substantially parallel to each other.

According to another embodiment, there is an electromagnetic (EM) surveying system for measuring EM signals. The EM surveying system includes a carrier configured to move along the ground; an EM transmitter connected to the carrier and configured to generate EM signals; and an EM receiver system connected to the carrier and configured to record the EM signals. The EM receiver system includes a frame, a first EM receiver attached to the frame and configured to measure the EM signals within a first frequency range, and a second EM receiver attached to the frame and configured to measure the EM signals within a second frequency range. Corresponding axes of the first and second EM receivers are substantially parallel to each other.

According to still another embodiment, there is a method for measuring electromagnetic (EM) signals. The method includes a step of receiving information about EM signals to be generated; a step of estimating a frequency spectrum to be recorded; and a step of selecting a number of EM receivers to be used to measure the frequency spectrum. The EM receivers include a first EM receiver configured to measure the EM signals within a first frequency range and a second EM receiver configured to measure the EM signals within a second frequency range. Corresponding axes of the first and second EM receivers are substantially parallel to each other.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 1 is a schematic diagram of an EM acquisition system;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an EM system with plural EM receivers that records EM fields related to geophysics. However, the embodiments to be discussed next are not limited to geophysics; they may be applied to other fields.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, EM measurements for geophysics occur over a large frequency spectrum, from sub 25 Hz (lower base frequencies provide greater depth of exploration suitable for hydrocarbon surveys, but are limited by coil sensitivity at these low frequencies) to over 100 kHz. Many designs attempt to perform broadband measurements, measuring the EM energy with a single EM receiver over a wide range of frequencies. A general limitation of this practice is that the resolution of some frequency range is compromised because all frequencies cannot be measured equally well (in terms of noise levels) with any existent single EM receiver.

However, it is possible to tailor-design an EM receiver to measure a particular frequency range well. Therefore, according to an embodiment, a process of simultaneous measurements of EM fields is implemented by using multiple EM receivers (at least two) which have different sensitivities to different parts of the frequency spectrum. Measuring the EM fields with multiple receivers will provide the best resolution for different parts of the spectrum. This process can be applied to both active and passive EM geophysics.

Figure 2A:
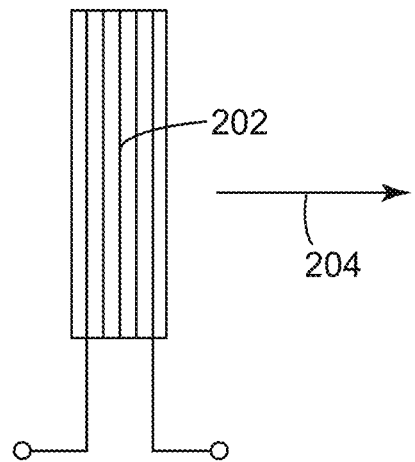
FIGS. 2A and 2B illustrate various arrangement of EM receivers.
Figure 2B:
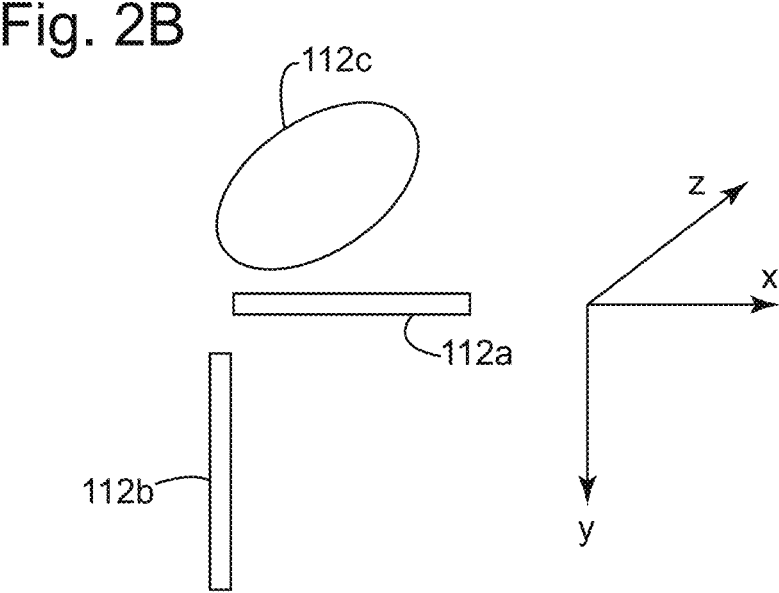
Figure 3:
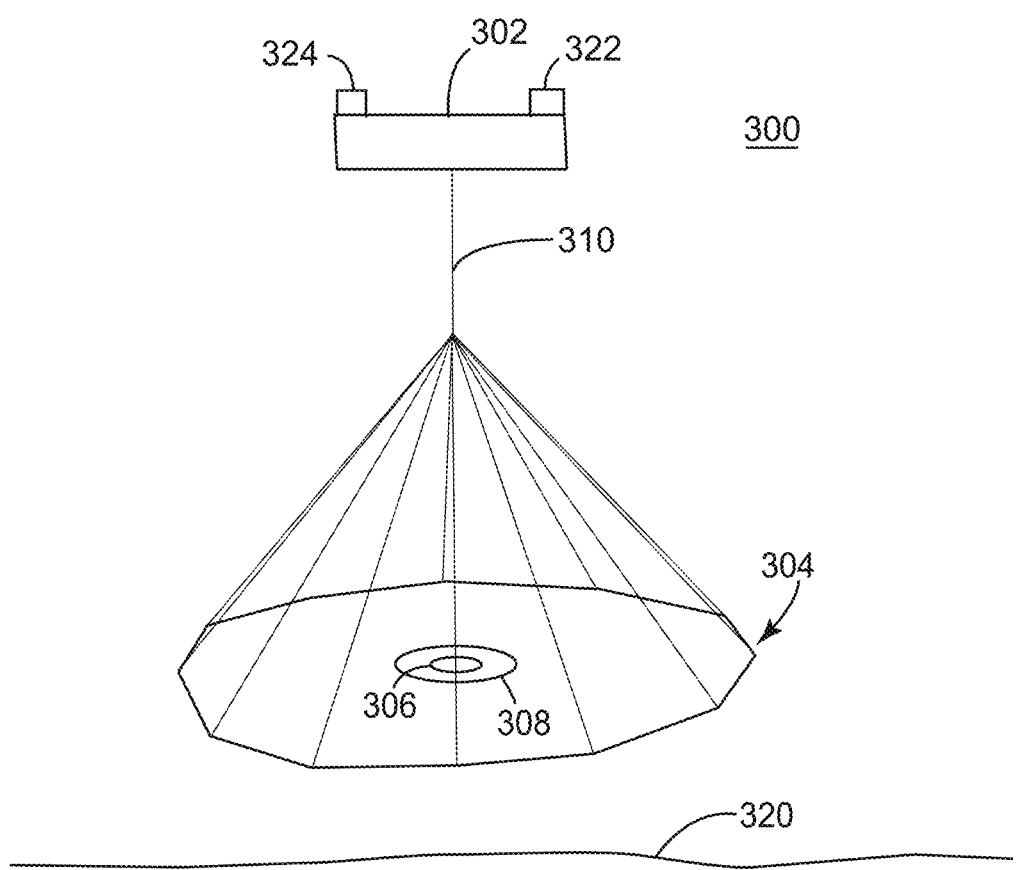
FIG. 3 illustrates an EM acquisition system having plural EM receivers.

According to an embodiment illustrated in FIG. 3, an EM system 300 includes a carrier 302 to which an EM transmitter 304 and two or more EM receivers 306 and 308 are attached via a link 310. Carrier 302 may be an aircraft, e.g., helicopter, airplane, air balloon, etc., or a terrestrial vehicle, e.g., a truck, that travels on ground 320, or a marine vehicle, e.g., a vessel, submarine, autonomous underwater vehicle, etc. For simplicity, FIG. 3 shows carrier 302 as being an aircraft.

EM transmitter 304 may be any known EM source. In this embodiment, EM transmitter 304 has a polygonal shape and a diameter of about 30 to 60 m. Other sizes and shapes are also possible. Link 310 may provide not only a mechanical strength member for supporting the weight of EM transmitter 304, but also an electrical member for exchanging electrical signals between carrier 302 and EM transmitter 304. For example, it is possible that carrier 302 has a controller 322 that controls the EM field emissions generated by EM transmitter 304. Carrier 302 may also include a power source 324 and suitable electronics for supplying electrical power to EM transmitter 304.

Figure 4A:
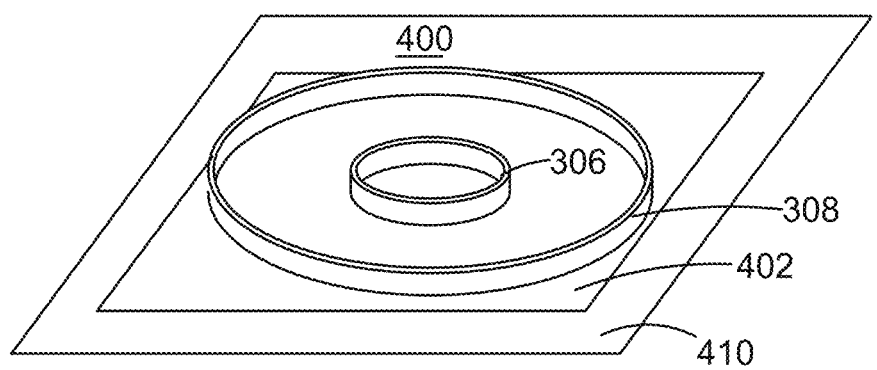
FIGS. 4A-D illustrate various distributions of plural EM receivers in an EM acquisition system.

Link 310 may also be connected to EM receivers 306 and 308 to provide mechanical and/or electrical connections. FIG. 3 shows, for simplicity, only two EM receivers 306 and 308, but any number of receivers is possible. EM receivers 306 and 308 may be located in the same horizontal plane or not. They may have different geometries and/or compositions for recording, with high accuracy, different frequency ranges. For example, as illustrated in FIG. 4A, EM receiver 306 has a smaller diameter than EM receiver 308, and the two receivers are concentric and located in a same plane 410. EM receivers 306 and 308 form a receiver system 400 in FIG. 4A. Receiver system 400 may include a body or frame 402 to which EM receivers 306 and 308 are fixedly attached. Frame 402 is mechanically attached to link 310.

Figure 4B:
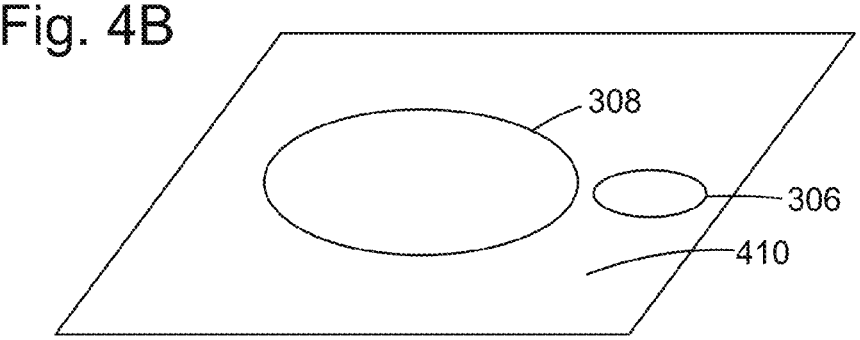
Figure 4C:
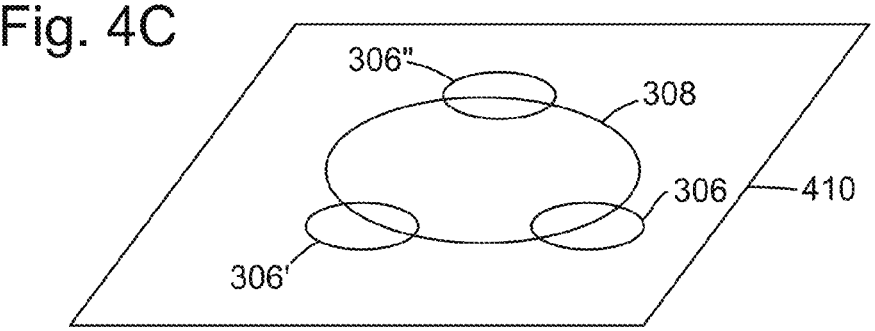
Figure 4D:
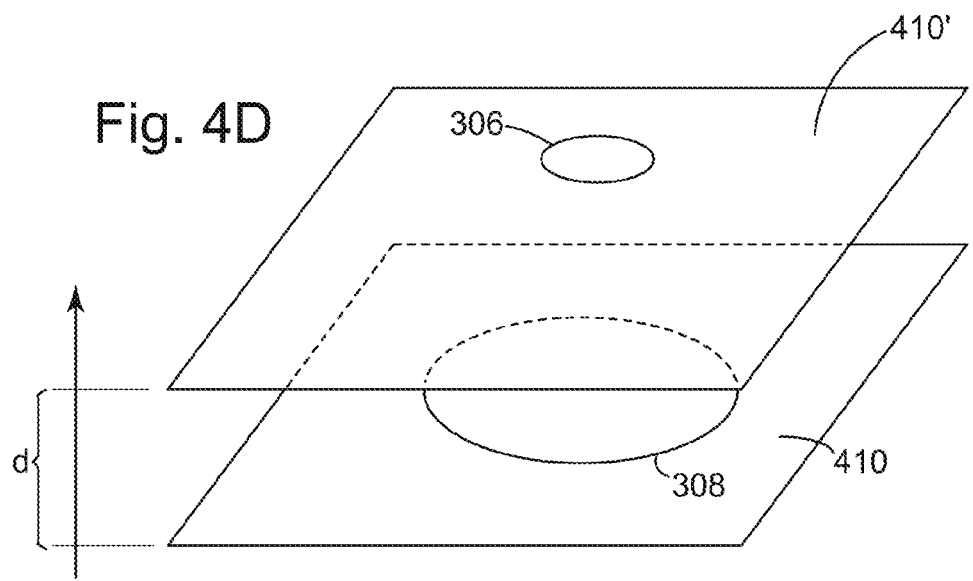

In one application, the number of coils of EM receiver 306 is n1 and the number of coils of EM receiver 308 is n2, with n1 being different from n2. In one embodiment, the number of coils n1 and n2 is the same. In another application, a diameter of the wire used to make the coil is different for the two receivers. In still another embodiment, the material from which the coils are made is different for the two receivers. In still another application, instead of locating EM receivers 306 and 308 in the same plane 410, as illustrated in FIG. 4A, EM receivers 306 and 308 may be arranged in the same plane 410, but not concentric to each other, as illustrated in FIG. 4B. Further, in another embodiment illustrated in FIG. 4C, the small size EM receiver 306 may be placed to overlap the large size EM receiver 308. In this way, a mutual interaction between the two coils is minimized or nulled. In one variation of this embodiment, multiple small size EM receivers 306, 306' and 306" may be distributed in the same plane 410 as the large size EM receiver 308, but overlapping it, as also shown in FIG. 4C. In still another embodiment illustrated in FIG. 4D, the two EM receivers 306 and 308 may be distributed in two substantially parallel planes 410 and 410', offset by a distance d. The two EM receivers may be concentric to each other when viewed from above the planes, or not. However, those skilled in the art would recognize that the two EM receivers may have other positions relative to each other. A common feature of all these embodiments is the fact that the EM receivers are tailored for different frequency ranges corresponding to a magnetic field oriented along a given direction.

Figure 5:
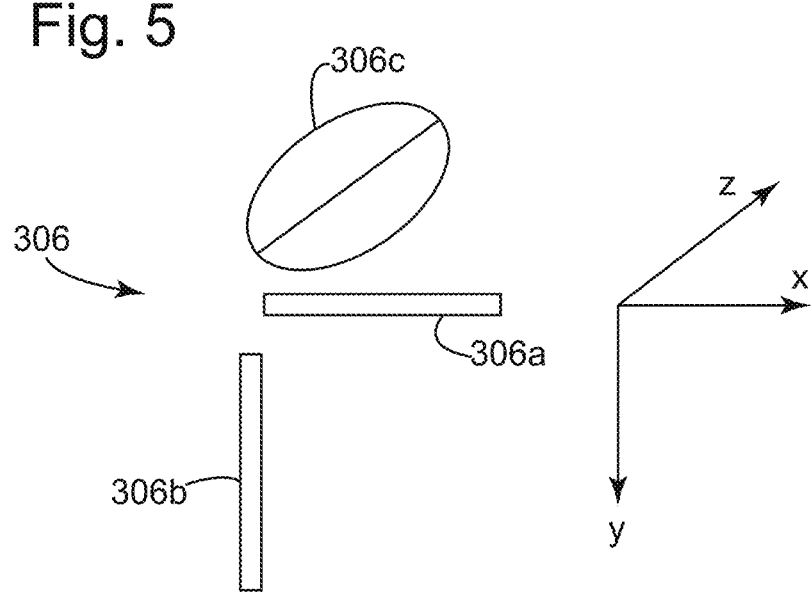
FIG. 5 illustrates an EM receiver having coils distributed in different planes.

In one embodiment illustrated in FIG. 5, EM receiver 306 has multiple coils 306a-c, distributed in three orthogonal planes so that EM signals from any direction can be recorded. EM receiver 308 may also include multiple coils. Note that EM receiver 306 in FIG. 5 is different from the embodiments illustrated in FIGS. 4A-D because even if coils 306a-c are configured to measure different frequency ranges, each coil 306a-c would measure a differently oriented magnetic field.

Figure 6:
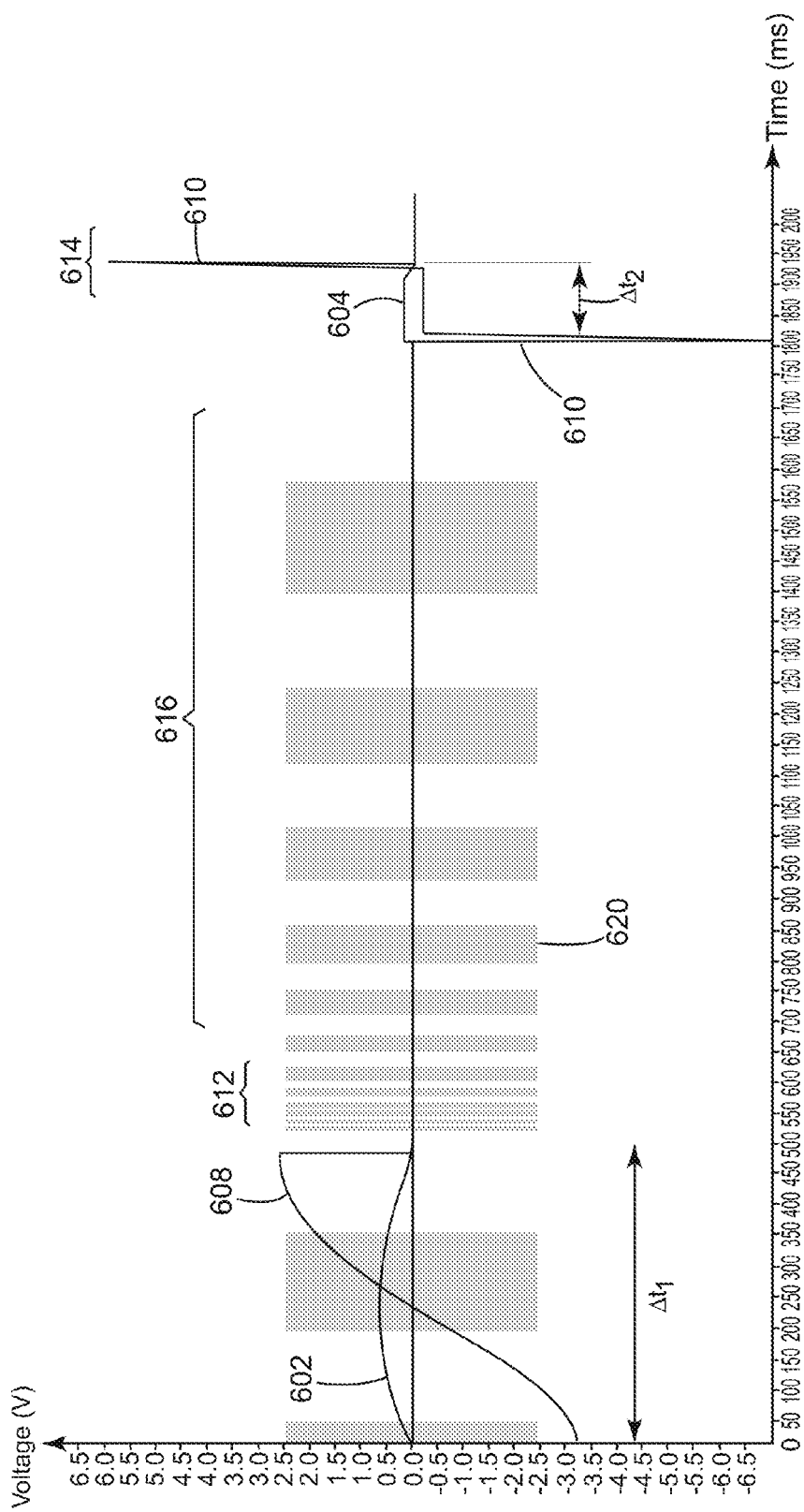
FIG. 6 illustrates EM signals transmitted by a transmitter and EM signals to be recorded with plural EM receivers.

Next is discussed how to select the EM receivers for a given EM survey. For this embodiment, assume that EM signals are generated by one or more EM transmitters. For example, as illustrated in FIG. 6, suppose that a first waveform 602 is generated during a first time interval $\Delta t1$, and a second waveform 604 is generated during a second time interval $\Delta t2$. For example, the embodiment illustrated in FIG. 6 has for the first waveform a half-sine excitation and for the second waveform a square wave. Other types of waveforms may be used and/or other combinations of them. No waveform is generated by the EM transmitter between first and second time intervals $\Delta t1$ and $\Delta t2$, i.e., the EM transmitter is turned off between these two time intervals. A response of an EM receiver during first time interval $\Delta t1$ is shown in FIG. 6 as curve 608, and a response of the same EM receiver during the second time interval $\Delta t2$ is shown as curve 610. Note that first waveform 602 is generated by having a large current circulating in the transmitter to emit primarily low-frequency signals that penetrate deep into the earth, while the second waveform 604 is generated with a small current and sharp rise and fall times to emit primarily higher frequencies. Further, for this embodiment, it is assumed that the EM receiver measures the time-rate of decay of magnetic field B, i.e., dB/dt.

FIG. 6 shows that the earth's response at time intervals 612 and 614 is expected to be rich in high frequencies while the earth's response at time interval 616 is expected to be rich in low frequencies. This is indicated by windows 620, which are narrow for the high frequencies and wide for the low frequencies. Each window 620 is used to collect (measure) the induced voltage into the EM receiver and to calculate the corresponding frequency.

For this particular arrangement illustrated in FIG. 6 (i.e., two different waveforms emitted with a given time offset), it is estimated to have two different EM receivers, a small size, few-turns coil 306 for recording the induced voltage in regions 612 and 614, and a large, many-turns coil 308 for recording the induced voltage in region 616. EM receiver 306 would have a relatively small area, which gives the receiver a shorter response time and better high-frequency performance, while EM receiver 308 would have a large area, more turns and more wire, which gives it superior low-frequency performance. Those skilled in the art will recognize that it is possible to combine many such receivers to obtain the desired frequency response performance. In other words, the embodiments are not limited to any one type of receiver.

An EM receiver is understood to be any sensor capable of measuring a magnetic field, magnetic field change or other quantity indicative of the magnetic field or magnetic field change. In one embodiment, multiple receivers of multiple types of sensors may be combined to sample the electromagnetic signal, for example, fluxgate sensors, SQUID sensors (Magnicon, Germany), caesium magnetometers, magnetoresistive sensors, Hall sensors, induction coil sensors, etc. The novel receiver arrangement discussed in the embodiments allows for multiple instances of each sensor type, each tuned to a different frequency band.

Figure 7:
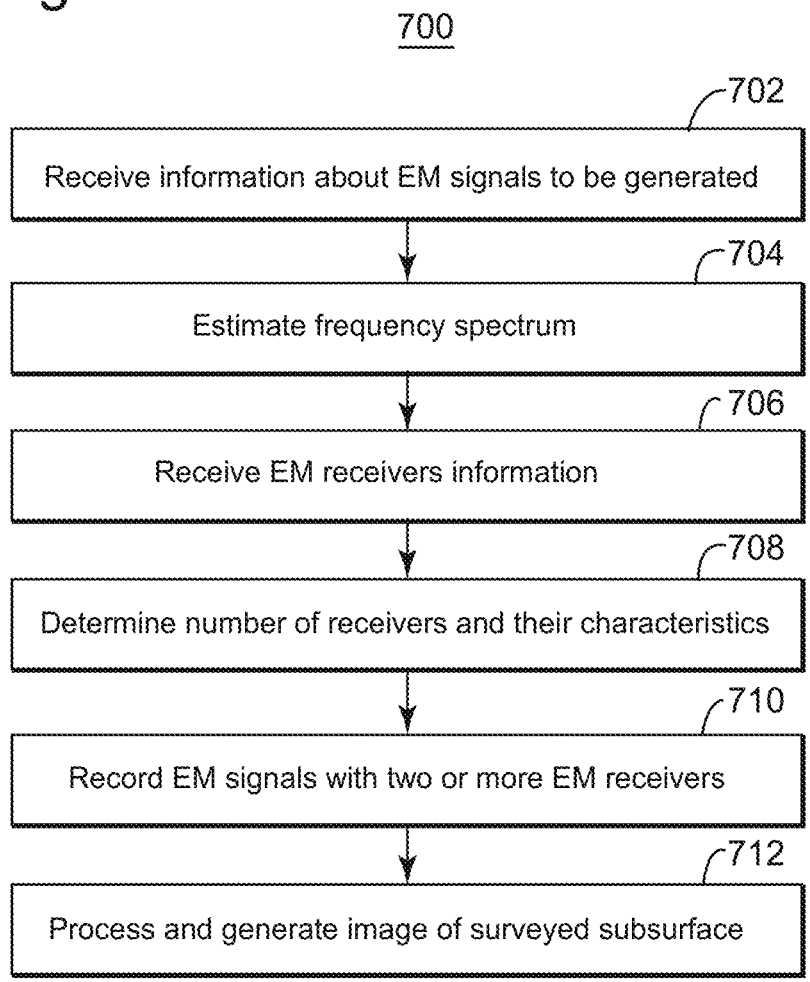
FIG. 7 is a flowchart of a method for selecting the plural EM receivers.

In one embodiment, the number of EM receivers to be deployed for a given EM geophysics survey is strongly correlated to the EM signals to be emitted by the EM transmitter. As discussed above with FIG. 6, generated EM signals may take various distributions, depending on the survey goals. According to an embodiment illustrated in FIG. 7, a method 700 for selecting the number and/or type of EM receivers is now discussed. In step 702, information is received regarding the EM signals to be generated. This information may include, for example, the number of waveforms to be generated and their characteristics, i.e., current versus time shape. Also, the information may include characteristics of the coils to be used as EM transmitters, e.g., number of coils, diameter of the coils, material of the wire, distance from ground, etc. In step 704, based on the generated EM signals, the earth's response is either estimated or measured with a single receiver for obtaining a frequency spectrum expected to be generated by the earth in response to the EM signals generated by the EM transmitter. The calculations or measurements performed in step 704 are not expected to be accurate, just indicative of the frequency spectrum to be expected. For example, previous EM surveys performed in this area may be used to estimate the frequency spectrum to be expected. In step 706, information about the available EM receivers is received. This step may be combined with step 702 or it may be performed prior to step 704.

Having information about the available EM receivers and also information about the expected frequency spectrum, in step 708 a decision is made about the number of EM receivers to be used and their characteristics, i.e., the frequency spectrum of each receiver, etc. An output of this step may be, for example, one EM receiver designed to measure EM signals in the range of sub 25 to 1,000 Hz, one EM receiver designed to measure EM signals in the range of 1 to 50 kHz, and one EM receiver designed to measure EM signals in the range of 50 to 100 kHz. Another possible output of this step is, for example, one EM receiver designed to measure EM signals in the range of sub 25 to 5,000 Hz, one EM receiver designed to measure EM signals in the range of 1 to 50 kHz, and one EM receiver designed to measure EM signals in the range of 40 to 100 kHz. According to this output, the EM receivers may be selected to have overlapping frequency ranges.

An additional step 710 may include recording the EM signals with the two or more EM receivers determined in step 708, and a step 712 of processing the recorded EM signals and generating an image of the surveyed subsurface.

Figure 8:
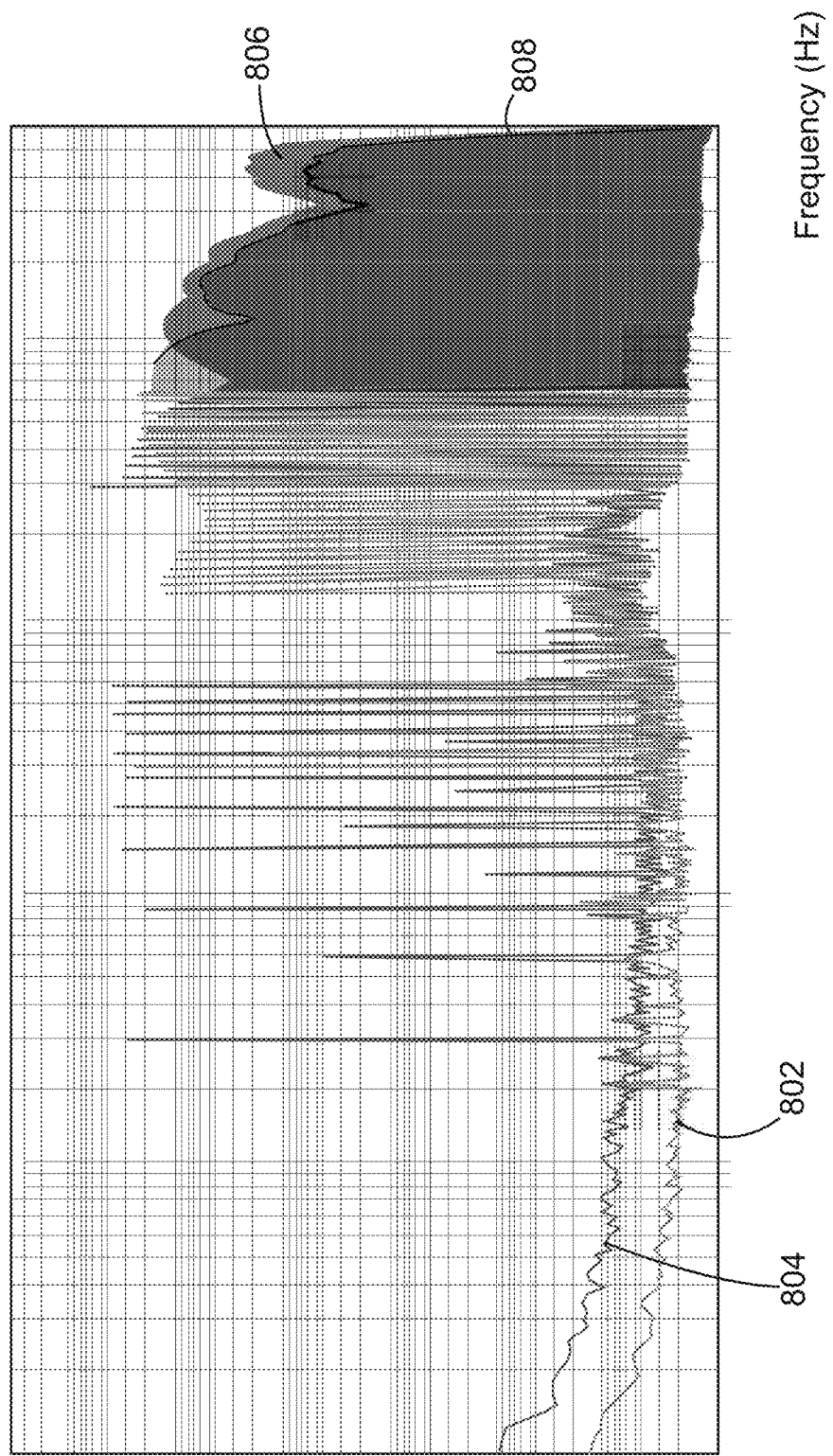
FIG. 8 illustrates frequency ranges recorded with the plural EM receivers.

One or more advantages of using two or more EM receivers is now discussed with regard to FIG. 8. FIG. 8 shows the low-frequency responses 802 and 804 of two different induction coil sensors (e.g., receivers 306 and 308) recorded in response to a transmitted half-sine excitation. The frequency measured in Hz is represented on the X axis. A quantity measured in nano volts per square meter ($nV/m^2$) is represented on the Y axis. This quantity is used to normalize the signals from different coils that may have different areas with different amplification factors so they can be directly compared. For example, one coil may have a small area but large amplifier gain, and the other coil may have a large area and a small amplifier gain. By normalizing to this unit ($nV/m^2$), both signals can be represented together on the same axis for direct comparison.

The additional high-frequency response 806 of the smaller induction coil (e.g., EM receiver 306) is shown in FIG. 8. This response is currently not recorded when a single EM receiver 308 is used. FIG. 8 also shows the high-frequency response 808 measured by the larger induction coil (e.g., EM receiver 308).

The half-sine excitation may be repeated at a base frequency of (for example) 30 Hz and, therefore, it produces very little signal below 30 Hz. Any signal below 30 Hz can be considered noise. FIG. 8 also shows the lower noise floor of the larger coil (e.g., EM receiver 308) at low frequencies. This multiple receiver design allows for even lower base frequencies (e.g., 6.25 Hz, 7.5 Hz, 12.5 Hz, 15 Hz, etc.) providing greater depth of exploration.

Thus, by measuring the EM signals with at least two EM receivers 306 and 308, the high-frequency performance 806 of one EM receiver 306 and the low-frequency performance 802 of the other EM receiver 308 can simultaneously be obtained, resulting in a superior measurement. A single EM receiver as traditionally used would require sacrificing either the low- or high-frequency information.

In other words, if two EM receivers having different frequency characteristics are used to simultaneously record EM signals generated by a passive or active EM source, then the high-frequency range is improved as shown by response 806 of EM receiver 306 and the low-frequency range is improved as shown by response 802 of EM receiver 308. By using more than two EM receivers that have different frequency response characteristics, a better measurement is expected than for a system having only two EM receivers.

For the case illustrated in FIG. 8, consider that the recordings of the first EM receiver 306 (i.e., low-frequency response 804 and high-frequency response 806) are described by data $D_1$, and the recordings of the second EM receiver 308 (i.e., low-frequency response 802 and high-frequency response 808) are described by data $D_2$. Data $D_1$ and $D_2$ from each EM receiver can be used individually to produce multiple grids or sections or models via data transformation or inversion (practitioners of the art will recognize that many techniques exist to process, map, transform, invert and/or model the data).

Alternatively, data $D_1$ and $D_2$ can be treated as two individual measurements and utilized simultaneously in a data mapping or data inversion or transformation process to obtain a single grid or section which captures information from each individual receiver and represents a single image of the subsurface.

In still another embodiment, data $D_1$ and $D_2$ can be combined into an equivalent single measurement D in the frequency domain (possibly accounting for the relative sensitivity and noise level of each receiver). The combined data D can then be used to create a grid or section and/or other such product or transformed to time-domain and used to create a grid or section and/or other such product that may represent an image of the surveyed subsurface.

There are many possible implementations of the geophysical system discussed above. The geophysical system can be passive, measuring the ambient electromagnetic field, or be active and employ a transmitter which generates an excitation electromagnetic field. An electromagnetic geophysical system may include many other peripheral sensors to determine the position or orientation or state of the electromagnetic measurement, such as Global Positioning System (GPS), radar or laser altimeter, gyroscopes or inclinometers measuring transmitter or sensor positions, thermometers, or other sensors measuring other geophysical data (such as radar or laser for topography, gravity or gradiometers sensors, spectrometer sensors, magnetometers to measure the ambient earth magnetic field, etc.). Consequently, there are also many different methods to record, process, combine and control all of these signals and sensors.

Figure 9:
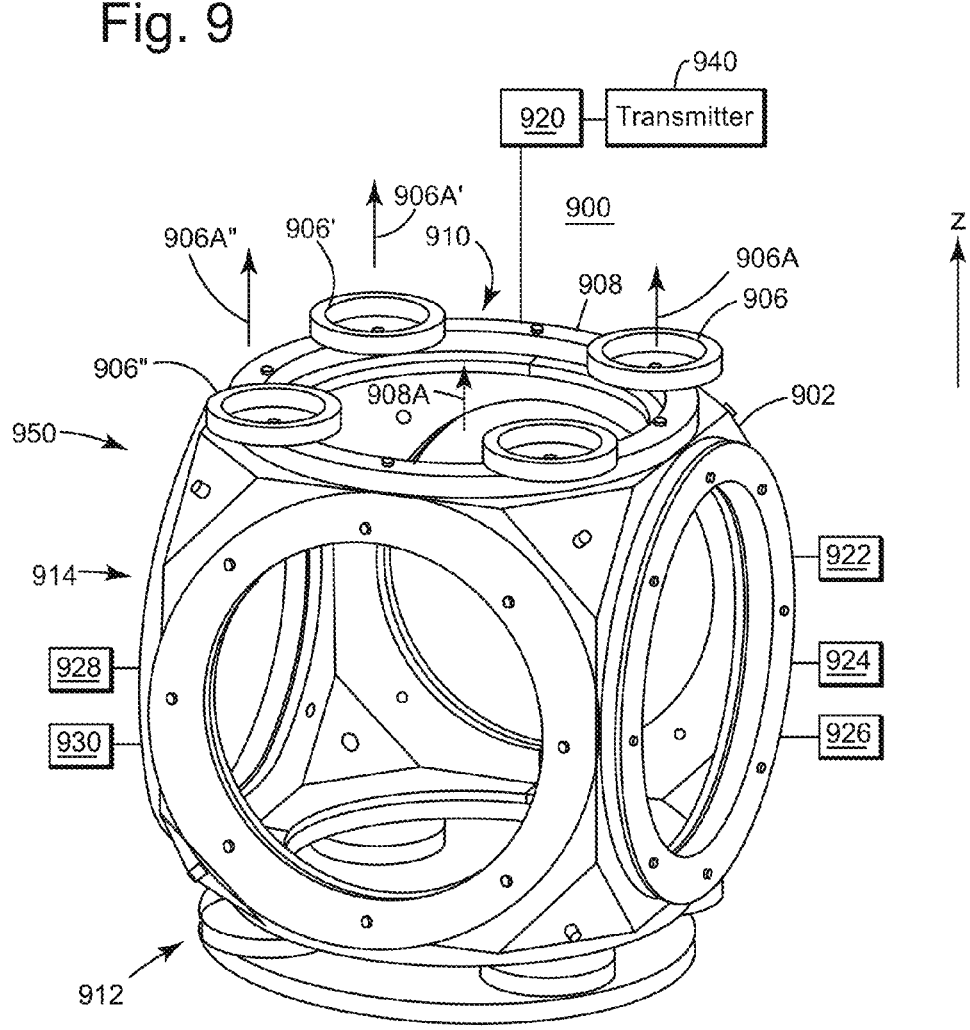
FIG. 9 illustrates a carrier having plural EM receivers.

An example of an EM survey system 950 is now discussed with regard to FIG. 9. EM survey system 950 may include an EM receiver system 900 that includes more than two EM receivers. EM receiver system 900 has a frame 902 that supports one large EM receiver 908 and four smaller EM receivers 906. These EM receivers may be similar to receivers 308 and 306, respectively. EM receiver system 900 shows each of the small EM receivers 906 being located over larger EM receiver 908. In this way, the magnetic mutual coupling of the EM receivers is minimized or nulled.

FIG. 9 shows the one large EM receiver 908 and four small EM receivers 906 located at a top region 910 of frame 902. The same arrangement of EM receivers may be located at a bottom region 912 of frame 902, just opposite to top region 910. Side regions 914 are shown in FIG. 9 not including any EM receivers. However, in one embodiment, one or more of the side regions 914 may include one or more EM receivers as necessary. Note that those EM receivers mounted on side regions 914 would measure magnetic fields having different directions than the one measured by the top and/or bottom regions 910 and 912. In other words, EM receivers 906 and 908 have corresponding axes 906A to 906A" and 908A substantially parallel to each other (and to a given direction, e.g., axis Z in the figure). The same is not true for potential EM receivers mounted on side regions 914 because their axes would be facing other directions, e.g., X and Y.

Frame 902 may be mounted on a carrier 920, e.g., truck, aircraft, etc. As discussed above, a controller 922 may be installed on frame 902, or on carrier 920 or on both. One or more sensors 924 for recording additional data, e.g., temperature, gravity, etc., may also be installed on frame 902. A power source 926 may be attached to frame 902 for powering one or more of the devices attached to it. In one embodiment, a GPS system 928 may be attached to frame 902 for generating its position during the recording. One or more storage devices 930 (e.g., a memory) may also be located on the frame for storing the recorded EM signals. An EM transmitter 940 may be connected to carrier 920 and configured to generate EM signals. These elements form EM surveying system 950.

Figure 10:
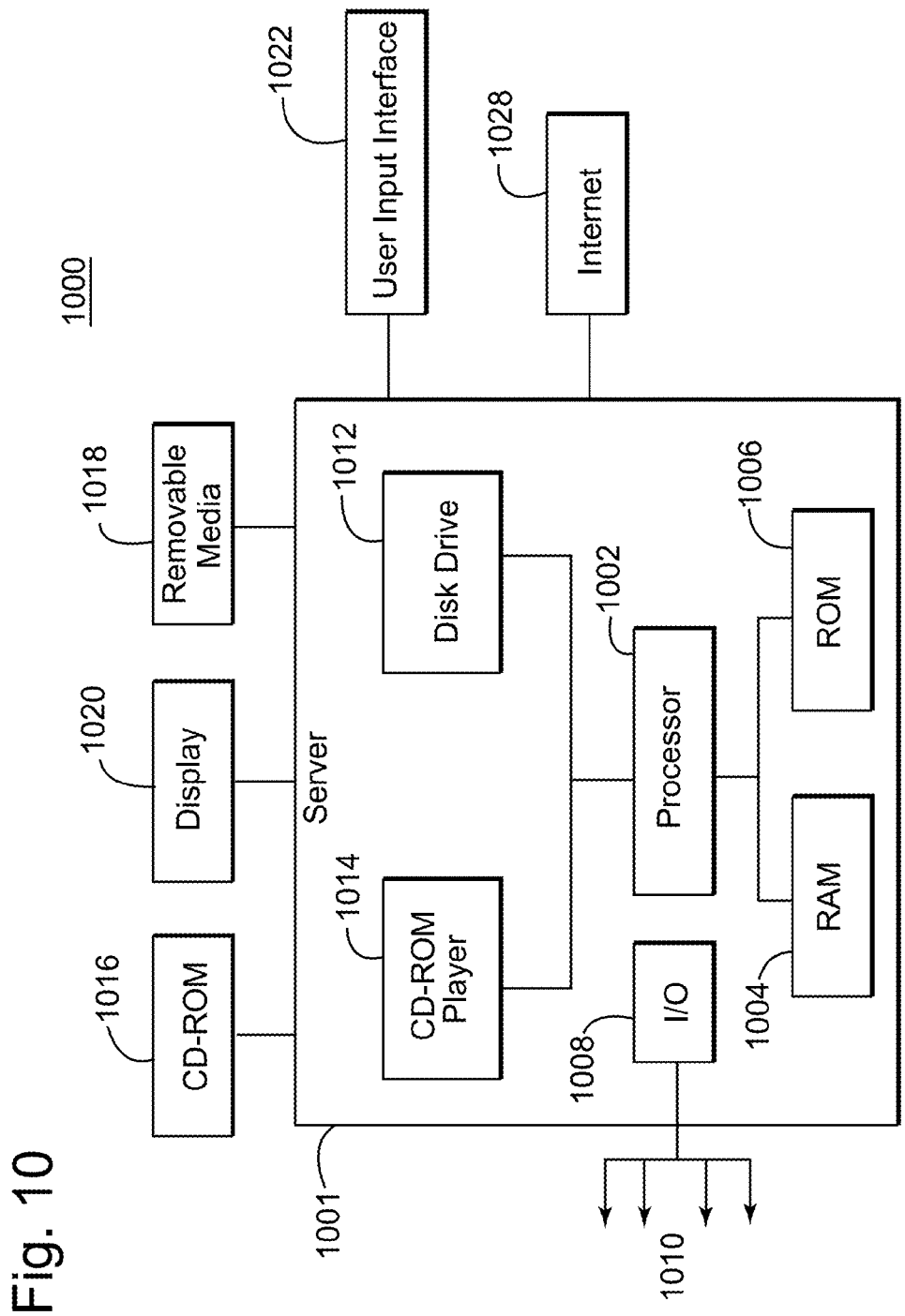
FIG. 10 is a schematic diagram of a control device.

The method discussed above with regard to FIG. 7 may be implemented in a processing device. An example of a processing device capable of carrying out operations in accordance with the embodiments discussed above is illustrated in FIG. 10. Such processing device may be located on the carrier 302, in a research facility, distributed at multiple sites, etc. Hardware, firmware, software or a combination thereof may be used to perform the various steps and operations described herein.

The exemplary processing device 1000 suitable for performing the activities described in the exemplary embodiments may include server 1001. Such a server 1001 may include a central processor unit (CPU) 1002 coupled to a random access memory (RAM) 1004 and/or to a read-only memory (ROM) 1006. The ROM 1006 may also be other types of storage media to store programs, such as programmable ROM (PROM), erasable PROM (EPROM), etc. Processor 1002 may communicate with other internal and external components through input/output (I/O) circuitry 1008 and bussing 1010, to provide control signals and the like. For example, processor 1002 may communicate with the various EM receivers, transmitter, etc. Processor 1002 carries out a variety of functions as are known in the art, as dictated by software and/or firmware instructions.

Server 1001 may also include one or more data storage devices, including disk drives 1012, CD-ROM drives 1014, and other hardware capable of reading and/or storing information, such as a DVD, etc. In one embodiment, software for carrying out the above-discussed steps may be stored and distributed on a CD-ROM 1016, removable media 1018 or other form of media capable of storing information. The storage media may be inserted into, and read by, devices such as the CD-ROM drive 1014, disk drive 1012, etc. Server 1001 may be coupled to a display 1020, which may be any type of known display or presentation screen, such as LCD, plasma display, cathode ray tube (CRT), etc. A user input interface 1022 is provided, including one or more user interface mechanisms such as a mouse, keyboard, microphone, touch pad, touch screen, voice-recognition system, etc.

Server 1001 may be coupled to other computing devices, such as the equipment of the carrier, via a link or network. The server may be part of a larger network configuration as in a global area network (GAN) such as the Internet 1028, which allows ultimate connection to the various landline and/or mobile devices involved in the survey.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such as a floppy disk or magnetic tape. Other non-limiting examples of computer-readable media include flash-type memories or other known types of memories.

This written description uses examples of the subject matter disclosed to enable any person skilled in the art to practice the same, including making and using any devices or systems and performing any incorporated methods. For greater clarity, the figures used to help describe the invention are simplified to illustrate key features. For example, figures are not to scale and certain elements may be disproportionate in size and/or location. Furthermore, it is anticipated that the shape of various components may be different when reduced to practice, for example. The patentable scope of the subject matter is defined by the claims, and may include other examples that occur to those skilled in the art. Such other examples are intended to be within the scope of the claims. Those skilled in the art would appreciate that features from any embodiments may be combined to generate a new embodiment.

The disclosed embodiments provide a method and EM receiver system capable of recording EM signals with a better bandwidth. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An electromagnetic (EM) receiver system for measuring EM signals, the EM receiver system comprising:
a frame;
a first EM receiver assembly attached to the frame; and
a second EM receiver assembly attached to the frame,
wherein each of the first and second EM receiver assemblies includes, a first EM receiver configured to measure the EM signals within a first frequency range, and a second EM receiver configured to measure the EM signals within a second frequency range, different from the first frequency range, wherein corresponding axes of the first and second EM receivers are substantially parallel to each other, and wherein corresponding axes of the first and second EM receiver assemblies are substantially perpendicular to each other.

2. The receiver system of claim 1, wherein the first EM receiver of the first EM receiver assembly is coplanar with the second EM receiver of the first EM receiver assembly.

3. The receiver system of claim 2, wherein the first EM receiver of the first EM receiver assembly is concentric with the second EM receiver of the first EM receiver assembly.

4. The receiver system of claim 1, wherein the first EM receiver of the first EM receiver assembly has a smaller diameter than the second EM receiver of the first EM receiver assembly.

5. The receiver system of claim 1, wherein the first frequency range partially overlaps with the second frequency range.

6. The receiver system of claim 1, wherein the first EM receiver of the first EM receiver assembly is designed to achieve more accurate measurements within the first frequency range than the second EM receiver of the first EM receiver assembly and the second EM receiver is designed to achieve more accurate measurements within the second frequency range than the first EM receiver.

7. The receiver system of claim 1, wherein the first EM receiver of the first EM receiver assembly is located to overlap with the second EM receiver of the first EM receiver assembly.

8. The receiver system of claim 7, further comprising additional first EM receivers also located to overlap with the second EM receiver.

9. The receiver system of claim 1, further comprising:
an EM transmitter; and
an electrical member for exchanging electrical signals between (1) an aircraft, terrestrial vehicle or marine vehicle and (2) the EM transmitter.

10. An electromagnetic (EM) surveying system for measuring EM signals, the EM surveying system comprising:
a carrier configured to move along the ground;
an EM transmitter connected to the carrier and configured to generate EM signals;
a frame configured to be attached to the carrier; and
plural EM receiver assemblies connected to the frame and configured to record the EM signals,
wherein each of the plural EM receiver assembly includes,
a first EM receiver configured to measure the EM signals within a first frequency range, and
a second EM receiver configured to measure the EM signals within a second frequency range, which is different from the first frequency range,
wherein corresponding axes of the first and second EM receivers are substantially parallel to each other, and wherein corresponding axes of two EM receiver assemblies of the plural EM receiver assemblies are substantially perpendicular to each other.

11. The system of claim 10, wherein the first EM receiver of the first EM receiver assembly is coplanar and concentric with the second EM receiver of the first EM receiver assembly.

12. The system of claim 10, wherein the first frequency range partially overlaps with the second frequency range.

13. The system of claim 10, wherein the first EM receiver, of the first EM receiver assembly, is designed to achieve more accurate measurements within the first frequency range than the second EM receiver of the first EM receiver assembly, and the second EM receiver is designed to achieve more accurate measurements within the second frequency range than the first EM receiver.

14. The system of claim 10, wherein the first EM receiver of the first EM receiver assembly is located to overlap with the second EM receiver of the first EM receiver assembly.

15. An electromagnetic (EM) system for measuring EM signals, the EM system comprising:
a frame configured to be attached to an aircraft, terrestrial vehicle or marine vehicle;
a first EM receiver located on a first face of the frame and configured to measure the EM signals within a first frequency range;
a second EM receiver located on the first face of the frame and configured to measure the EM signals within a second frequency range, different from the first frequency range;
a third EM receiver located on a second face of the frame and configured to measure the EM signals within the first frequency range; and
a fourth EM receiver located on the second face of the frame and configured to measure the EM signals within the second frequency range,
wherein corresponding axes of the first and second EM receivers are substantially parallel to each other, and corresponding axes of the third and fourth EM receivers are substantially parallel to each other, and
wherein the first face of the frame is perpendicular to the second face.

16. The EM system of claim 15, wherein the first EM receiver is designed to achieve more accurate measurements within the first frequency range than the second EM receiver, and
wherein the second EM receiver is designed to achieve more accurate measurements within the second frequency range than the first EM receiver.

17. The system of claim 15, wherein the first EM receiver is coplanar and concentric with the second EM receiver.

18. The system of claim 15, wherein the first frequency range partially overlaps with the second frequency range.

19. The system of claim 15, wherein corresponding axes of the first and third EM receivers are substantially perpendicular to each other, and corresponding axes of the second and fourth EM receivers are substantially perpendicular to each other.

20. The system of claim 15, wherein the first EM receiver is located to overlap with the second EM receiver.

* * * * *